Oct. 25, 1966   M. G. ANDREASEN ETAL   3,281,849
HORIZONTALLY-POLARIZED WIRE-GRID LENS RADIATOR
Filed Aug. 19, 1964   2 Sheets-Sheet 1
Fig. 1
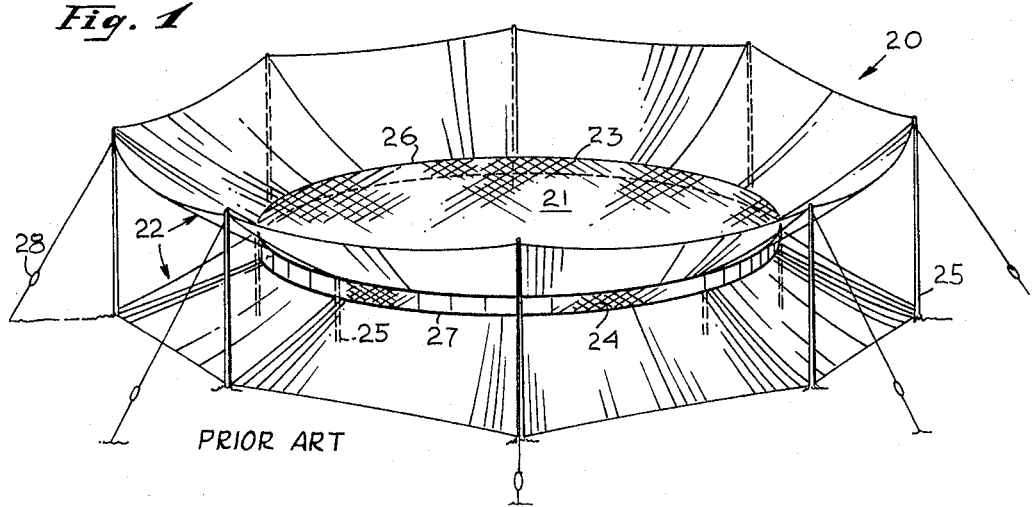
PRIOR ART
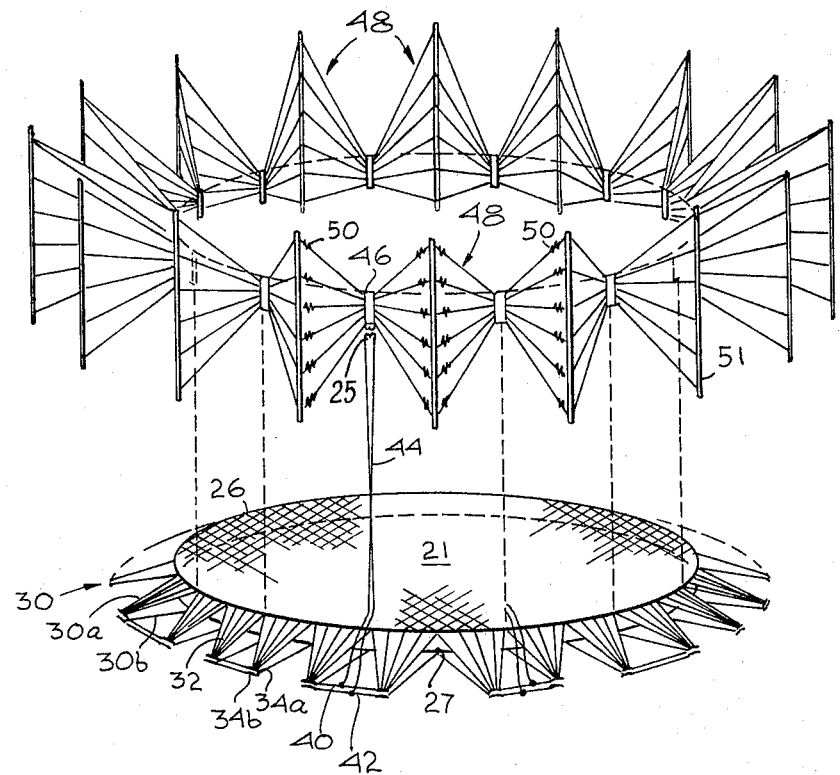
Fig. 2
INVENTORS
MOGENS G. ANDREASEN
EDWARD M. T. JONES
ROBERT L. TANNER
BY Samuel Lindenberg
ATTORNEY

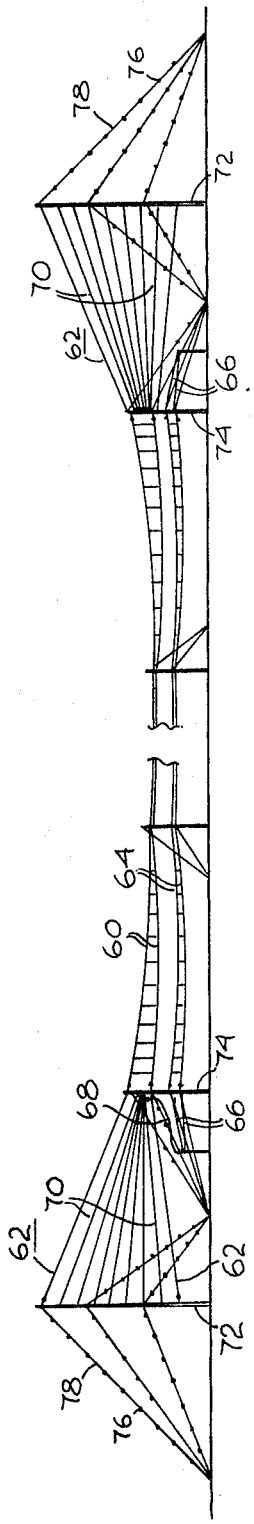
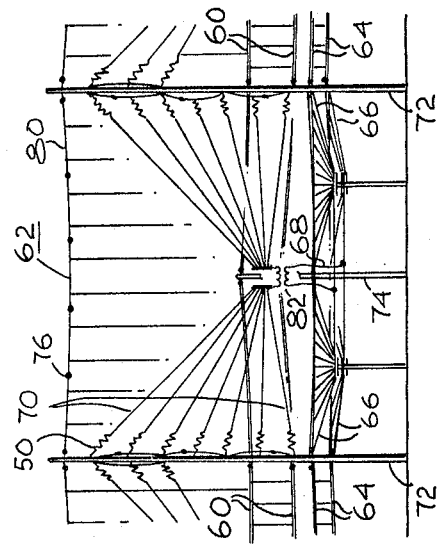
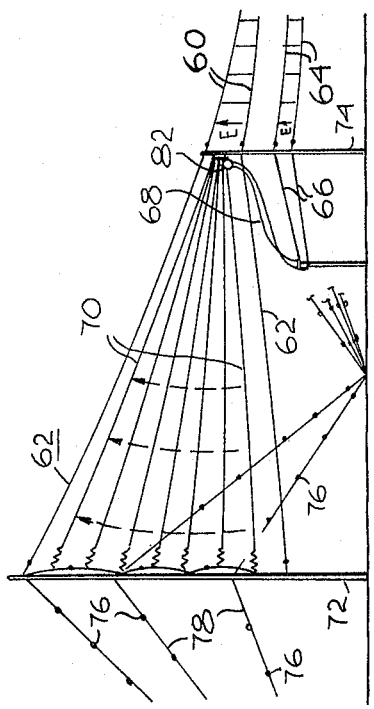

United States Patent Office 3,281,849
Patented Oct. 25, 1966

3,281,849
HORIZONTALLY-POLARIZED WIRE-GRID LENS RADIATOR
Mogens G. Andreasen, Menlo Park, Edward M. T. Jones, Portola Valley, and Robert L. Tanner, Menlo Park, Calif., assignors, by mesne assignments, to Control Data Corporation, South Minneapolis, Minn., a corporation of Minnesota
Filed Aug. 19, 1964, Ser. No. 390,607
11 Claims. (Cl. 343—753)

In Patents Nos. 3,234,556 and 3,234,557, respectively for a Uniform Wire-Grid Lens Antenna and for a Non-Uniform Wire-Grid Lens Antenna, both applications by Robert L. Tanner, and both applications assigned to a common assignee, there are described a broad band wire-grid lens antenna which is useful in the frequency range below 1 megacycle to above 1,000 megacycles. Briefly described, this wire-grid lens is circular in shape and is constructed from a pair of opposed spaced wire grid meshes. The size of the individual meshes is dimensioned to be small compared with the shortest operating wavelength, to provide a propagation characteristic which is substantially independent of the operating frequency and isotropic.

In the principal embodiment of this invention, the equivalent dielectric constant of the wire mesh grid structure, is changed by changing the distance between opposite grids from a distance which is small compared with the mesh size to a distance of separation which is large compared to the mesh size. By properly varying the distance of separation between different portions of the grids, and thereby the velocity of propagation, a lens having circularly symmetric beam forming properties may be built.

In all embodiments of the wire-grid lens which are shown, the electromagnetic waves which propagate between the two wire mesh grids have their principal components of electric field normal to the mid-plane of the wire grids. In many typical applications, the mid-plane of the wire-grid lens is approximately horizontal. Therefore, in these instances, the electromagnetic waves propagating within the wire-grid lens are vertically polarized with respect to the surface of the earth. It is, however, perfectly feasible to orient the wire-grid lens to lie along other planes, in particular, if the wire-grid lens mid-plane is vertical, the polarization of the lens with respect to the ground is horizontal. However, for simplicity in construction, the lens is normally made so that the two wire mesh grids are substantially parallel to the ground and therefore the polarization of the electromagnetic waves propagating within the wire-grid lens is vertical with respect to the surface of the earth.

The electromagnetic waves that are focused within the wire-grid lens cannot be radiated efficiently from the aperture at the edge of the lens because its vertical dimension, measured in terms of operating wavelength, is too small. Therefore, for efficient radiation, it is necessary to provide a larger vertical radiating aperture and a suitable transition between this aperture and the circumference of the lens. In the previously-described patent applications, this transition is provided by a biconical horn constructed from the wire-grid mesh. Because the biconical horn affects a smooth continuation of the contour of the wire-grid lens, it efficiently launches a vertically polarized wave into space.

An object of this invention is to provide transition structures for a lens of the type generally described which can radiate horizontally polarized waves into space.

Another object of the present invention is to provide transition structures at the periphery of a lens of the general type described which can couple the lens efficiently to a large vertical aperture and at the same time rotate the plane of polarization by 90°.

Yet another object of the present invention is to provide a construction for a lens of the type described such that both a vertically polarized and a horizontally polarized radiating aperture can be made to occupy essentially the same volume of space making it possible to construct a dual polarized wire-grid lens antenna that can radiate or receive both horizontally and vertically polarized waves.

Still another object of the present invention is the provision of a novel and useful transition structure for utilization with a lens of the type described.

These and other objects of this invention may be achieved by providing a structure at the periphery of the lens which effectively couples the electromagnetic waves which emerge from between the two wire mesh grids to a wave guide and thereafter to a transmission line which rotates the polarization of the energy therein and thereafter couples to a radiating horn for launching the electromagnetic energy whose polarization has been rotated. In another arrangement, both the radiating horn for vertically polarized electromagnetic waves and the radiating horn for horizontally polarized electromagnetic waves are constructed to effectively define opposite sides of a trapezoid. Because of the 90° orientation or polarization of the waves which are received or transmitted, these waves do not interfere with each other but may be separately received on the two differently polarized horns and thereafter either conducted directly to the lens structure or conducted via a transition structure of the type described to the lens structure which is constructed to handle the polarization selected.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a perspective view of a wire-grid lens antenna which is shown to assist in an understanding of this invention;

FIGURE 2 is a perspective exploded view of a transition structure in accordance with this invention;

FIGURE 3 is a sectional view of an antenna structure constructed to receive or transmit both horizontally and vertically polarized radiation, in accordance with this invention;

FIGURE 4 is an enlarged view of the fan assembly and biconical horn structure shown in FIGURE 3; and FIGURE 5 is a view in elevation showing the appearance of a single biconical horn and fan section in accordance with this invention.

FIGURE 1 shows a perspective view of a wire-grid lens antenna with which this invention is associated. FIGURE 1 is identical with FIGURE 1 in Patent No. 3,234,557 mentioned previously. The wire-grid lens antenna 20 has a center portion 21 forming a wire-grid lens for azimuthal beam shaping and a peripheral portion 22 forming a radiating structure for elevational beam shaping and for matching the impedance between a wire-grid lens 21 and the surrounding space. Radiating structure 22 is shaped in the form of a biconical or radially flared horn.

Wire-grid lens 21 includes an upper wire grid 23 and a lower wire grid 24 spaced in opposite and overlying relation by means of a plurality of non-conductive suspension or support members 25. As a practical matter, the peripheral portion of the upper wire grid 23 and lower wire grid 24 may be secured to rim members, such as a pair of aluminum rings 26, 27, respectively, which are light in weight and which form convenient conductive terminating and support edges. Furthermore, aluminum rings 26, 27 also provide a convenient means for attaching radiating structure 22 thereto. Support members 25 may comprise wooden, plastic or fiber glass poles anchored by means of guy wires having appropriate insulating members 28 inserted therein. The wire grids 23 and 24 are formed either throughout or in part, of composite metallic wires, that is, wires having two or more single-strand conductors substantially parallel to one another and lying in the surface defined by the respective wire grid. The mesh structure formed by the compound wires may have a variety of different geometric shapes. Upper and lower grid 23, 24 may be regarded as a pair of conductive surfaces having a predetermined point-to-point spacing.

The lens, when formed with proper alignment of correspondingly opposed meshes, has been found to have certain very important properties. As long as the operating wavelength is large compared to the mesh size, the transmission characteristic of the space between the wire grids is substantially independent of the operating frequency and depends solely on the distance of their separation. It is also desirable to make the diameter of the wire-grid lens several times larger than the longest operating wavelength.

As previously stated, since the mid-plane of the wire-grid lens is approximately horizontal, the electromagnetic waves propagating within the wire-grid lens are vertically polarized with respect to the surface of the earth.

FIGURE 2 illustrates an arrangement in accordance with this invention for converting the vertically polarized wave which is emitted from the wire-grid lens into a horizontally polarized wave and for launching same. FIGURE 2 comprises an exploded view wherein the lower portion comprises the grid mesh structure 21 together with the structures for collecting the vertically polarized wave therefrom which is thereafter rotated in polarization and applied to the structure shown in the upper portion of the drawing which radiates the horizontally polarized waves. The collectors 30 each comprise an upper half 30a which is identical with a lower half 30b. These collectors are made of wires 32. One end of all of the wires in the upper half of each collector is connected to the rim 26 forming the outer boundary of the upper lens grid element of the antenna and one end of all of the wires of the lower half 30b of each collector is connected to the conductive rim 27 of the lower lens grid element of the antenna. The spacing between the wires in the upper and lower half of each collector at the conductive rim which is the outer boundary of the lens should be approximately the same as the mesh size in the wire-grid lens in order that the collectors are well-matched to the waves within the lens. The horizontal and vertical dimensions of the collectors are decreased along their length so that the width of the upper and lower terminals respectively 34a, 34b, to which the respective upper and lower halves of the collectors are connected are small in terms of wavelength. The ratio of height-to-width (i.e. vertical spacing between upper and lower collectors to the widths of the respective collectors), on the collectors is maintained approximately constant along their length so that the electromagnetic energy traveling through them from the wire-grid lens 21 is carried with a minimum of reflection to the terminals 34a, 34b.

The collector structure described is provided all around the periphery of the lens. Pairs of terminals 34a, 34b may be connected in parallel by means of non-radiating balanced transmission lines 40. By way of example, and not as a limitation, these may be two wire transmission lines. Each one of these balanced transmission lines 40 is connected by a T junction 42 through another length of non-radiating balanced transmission line 44 which may be coupled through a transformer 45 to the terminals 46 of horizontally polarized horn structure 48, which is actually a radiating fan. The electric field in the terminals 34 is vertical while that in the terminals 46 is horizontal. This 90° rotation of polarization is effected by a 90° twist introduced in each of the transmission lines 44.

The horizontally polarized radiating fans or horns 48 are made from wire and are suspended at their outer ends by means of poles 51, which can be made from either an insulating or conductive material, since they are oriented at right angles to the horizontally polarized field in the aperture of the fans. Each horizontally polarized fan 48, which is made of a plurality of wires as shown, is flared in both the horizontal and vertical dimension. The ratio of width-to-height of the horns 48 (i.e. distance between the fans of a horn to the distance along a line intercepted thereby which is in the plane of a fan) is maintained approximately constant in order to maximize the transmission of electromagnetic energy along the fans. The vertical spacing between the adjacent wires in a fan at its outer extremity can be as large as a quarter wavelength at the highest operating frequency and will still provide the proper guiding action for the horizontally polarized waves within the fans.

For efficient radiation into space, it is necessary that the top of the fans at the outer poles 50 be at least a quarter of free space wavelength above ground at the lowest operating frequency. The number of fans and hence the width of the radiating aperture of the fans are determined by the minimum beam width in degrees which is approximately 360 divided by the number of fans.

Adjacent wires at the outer extremities of the fans are connected together by means of the resistors 50. The resistors 50 terminate the outward flowing current on the fans and minimize or suppress the reflected inward traveling waves which would otherwise exist. The value of resistance used is not critical and is approximately that necessary to terminate the V transmission line formed by each pair of wires 48 in adjacent fans.

FIGURE 3 is a cross-sectional view of a dual polarized wire-grid lens antenna taken along the center line of the antenna; FIGURE 4 is an enlargement of a typical section of the outer part of the antenna, and FIGURE 5 is a view looking into the horn and fan arrangement of the antenna. Reference will be made to all of the drawings in the course of the description which follows. Actually, two antennas are shown, one of these being a wire-grid lens antenna as shown in FIGURE 1 and the other a wire-grid lens antenna as shown in FIGURE 2. In FIGURE 3, there may be seen a segment of a vertically polarized wire-grid lens 60 which is connected to a vertically polarized wire-grid horn 62, and another vertically polarized wire-grid lens 64, beneath the wire-grid lens 60, which is connected through a series of collectors 66, and transmission lines 68 (not shown in FIGURE 5 for reasons of maintaining clarity), to the horizontally polarized radiating fans 70. Even though the two antennae occupy essentially the same volume of space, they are electrically decoupled. Therefore, suitable vertically polarized feeds placed within wire-grid lens 60 will receive vertically polarized signals incident upon the aperture of the horn 62. Similarly, suitable vertically polarized feeds placed within wire-grid lens 64 will receive horizontally polarized signals incident on the common aperture of the horn and the fans.

Decoupling between the two wire-grid lenses 60 and 64 is achieved by using adequate vertical separation between them. Decoupling between the fields in the common aperture is achieved because the horizontal fields in the fan are spacially orthogonal to the vertically polarized fields in the wire-grid horn.

All structural members illuminated by the radiating aperture must be made electrically transparent to both horizontally and vertically polarized waves in order to avoid pattern distortion. Thus, the outer and inner poles 72, 74, must be made of wood, fiber glass, or other non-conducting material. Similarly, insulators 76 must be inserted at intervals of less than one-third wavelength at the highest operating frequency in all of the structural guy wires 78 as well as the upper and lower bridles 80 (shown in FIGURE 5) comprising the outer boundary of the wire-grid horn 62. It is also necessary to provide transformers 82 which are connected into the balanced transmission lines 68 in order to pass the desired balanced mode on the transmission line which is set up when the fans 70 are illuminated by incident horizontally polarized signals, and at the same time suppress the undesired unbalanced mode set up on the transmission lines when the fans are illuminated by incident vertically polarized signals.

The beam forming properties of a wire-grid lens antenna using the transition structure described in accordance with this invention are the same as the beam forming properties of the wire-grid lens with the vertically polarized wire mesh horn. The dual polarized version of the wire-grid lens antenna can receive both horizontally polarized and vertically polarized signals at separate sets of terminals. Therefore, since the receiving apertures for both polarized waves is the same, the antenna can be used for polarization diversity reception. It is well known that polarization diversity reduces the severity and magnitude of the fading observed when receiving HF radio signals arriving by way of the ionosphere. Therefore, the dual polarized antenna described will be much less subject to fading than either vertically polarized or horizontally polarized wire-grid lens antennas.

There has accordingly been described and shown herein a novel, useful and unique transition structure whereby a wire-grid lens, which is constructed for handling only vertically polarized waves can be utilized for handling horizontally polarized waves.

What is claimed is:

1. In a wire-grid lens antenna of the type wherein the lens comprises two substantially circular wire mesh grids which are spaced from one another a predetermined distance, a transition structure for rotating the polarity of the wave which can be handled by said wire-grid lens comprising a plurality of collector means coupled to the peripheries of said upper and lower wire grid meshes spaced about the peripheries thereof for collecting electromagnetic energy from said wire-grid lens, said collector means extending outward from said peripheries of said upper and lower wire grid meshes, a radiating fan horn for each collector means, each said radiating fan horn having a polarization which is orthogonal with respect to the polarization of the electromagnetic waves handled by said wire-grid lens, and coupling means for converting the polarization of the electromagnetic energy collected by said collector means to the polarization of said radiating horns coupled between said collector means and said radiating horn.

2. In a wire-grid lens antenna of the type recited in claim 1 wherein said collector means each comprises an upper portion and a lower portion, said upper portion comprising a plurality of wires having one end connected to the periphery of the upper lens mesh at points spaced therealong, an upper terminal whose size is small when compared to the wavelength of operation of said antenna, said wires of said upper portion of said collector means extending away from said upper wire grid mesh to connect to said upper terminal, said lower portion of the collector means comprising a plurality of wires having one end connected at spaced points along the outer periphery of said lower grid mesh, a lower terminal having a size which is small compared to the operating wavelength of said antenna, the wires of said lower portion of said collector means extending to connect to said lower terminal, the wires of said upper and lower portions of said collector means extending outward and toward each other from the respective peripheries of said upper and lower lens meshes in a manner to decrease the dimensions of a coupling means so that the ratio of height-to-width is maintained approximately constant.

3. In a wire-grid lens antenna as recited in claim 1 wherein each said radiating fan horn for each collector means includes a first terminal, a second terminal spaced therefrom, said first and second terminals having a length which is small when compared to the operating wavelength of said antenna, said coupling means being coupled to said first and second terminals, a first and second plurality of wires respectively having one end connected to said first and second terminals and flaring outwardly therefrom to define two divergent fan-like structures, and first and second means for respectively supporting the other ends of said respective first and second plurality of wires.

4. In a wire-grid lens antenna of the type wherein the lens comprises two substantially circular wire mesh grids which are spaced from one another a predetermined distance, a transition structure for rotating the polarity of the wave which can be handled by said wire-grid lens comprising a plurality of collector means coupled to the peripheries of said upper and lower wire mesh grids spaced about the peripheries thereof for collecting electromagnetic energy from said wire-grid lens, each said collector means comprising an upper first plurality of wires, and a lower second plurality of wires, respectively having one end connected to the respectively peripheries of the upper and lower wire mesh grids, a first and a second terminal, each having a length which is small when compared to the wavelength of operation of said antenna, the other end of said first plurality of wires being connected to said first terminal, the other end of said second plurality of wires being connected to said second terminal, said first and second plurality of wires extending outward from said respective upper and lower lens grid peripheries to said respective first and second terminals to define two fan-like structures having their vertices at said first and second terminals which are spaced closer together than the spacing between said lens mesh peripheries, a radiating fan horn for each collector means, each said radiating fan horn having a polarization which is orthogonal relative to the polarization of said wire-grid lens, and coupling means for converting the polarization of the electromagnetic energy collected by said collector means to the polarization of said radiating fan horns coupled between each two said collector means and a radiating horn.

5. In a wire-grid lens antenna as recited in claim 4 wherein in each said collector means the wires of said upper first plurality of wires and the lower second plurality of wires extend outward and toward each other from the respective peripheries of said upper and lower lens elements in a manner to decrease the dimensions of said collector means so that the ratio of height-to-width is maintained approximately constant.

6. In a wire-grid lens antenna as recited in claim 4 wherein each said coupling means includes a non-radiating balanced transmission line connected between the first and second terminals of each two collecting means, a second non-radiating balanced two wire transmission line having one end connected to a fan horn, and a T junction connecting the other end of said second two wire transmission line to said first two wire transmission line.

7. In a wire-grid lens antenna as recited in claim 4 wherein each said radiating fan horn for each two collector means comprises a first terminal, a second terminal spaced therefrom, said first and second terminals having a length which is small when compared to the operating wavelength of said antenna, said coupling means being coupled to said first and second terminals, a first and second plurality of wires respectively having one end connected to said first and second terminals and flaring outwardly therefrom to define two divergent fan-like structures, the ratio of width-to-height of each of said radiating fan horn structures being maintained substantially constant, and first and second means for respectively supporting the other of said respective first and second plurality of wires.

8. An antenna for receiving two orthogonally related polarized waves comprising a first and a second circular wire-grid lens positioned one above the other in substantially superimposed relationship and both capable of handling the same one of said orthogonally related polarized waves, biconical horn means coupled to the periphery of said first circular wire-grid lens for enabling it to receive said one of said orthogonally related polarized waves, said biconical horn extending radially outward from said first circular wire-grid lens and having an upper and a lower section between which an aperture is defined, fan horn means positioned in said biconical horn means aperture for receiving waves orthogonally polarized to those received by said biconical horn means, and means coupled between said fan horn means and said second circular wire-grid lens for converting the polarization of the received waves to that of said second circular wire-grid lens.

9. An antenna for receiving two orthogonally related polarized waves comprising a first and a second circular wire-grid lens positioned one above the other in substantially superimposed relationship and both capable of handling the same one of said orthogonally related polarized waves, biconical horn means coupled to the periphery of said first circular wire-grid lens for enabling it to receive said one of said orthogonally related polarized waves, said biconical horn extending radially outward from said first circular wire-grid lens and having an upper and a lower section between which an aperture is defined, a plurality of collector means coupled to the periphery of said second circular wire-grid lens for collecting electromagnetic energy from said wire-grid lens, a plurality of fan horn means positioned in the aperture of said biconical horn means for receiving waves orthogonally polarized to those received by said biconical horn means, and means coupled between the respective fan horn means and collector means for converting the polarization of the received waves to that of said second wire-grid lens.

10. An antenna as recited in claim 9 wherein said biconical horn means upper and lower sections are increasingly farther apart with increasing distance from said first wire-grid lens and each said fan horn means includes a first terminal, a second terminal positioned within substantially the narrowest spacing of said upper and lower sections, said first and second terminals being small relative to the wavelength of the operating frequency of said antenna, a first fan-like structure made of a first plurality of wires extending from said first terminal outward to the edge of said biconical horn means and a second fan-like structure made of a second plurality of wires extending from said second terminal outward to the edge of said biconical horn, said first and second fan-like structures being orthogonal to the upper and lower sections of said biconical horn means and diverging outwardly from each other.

11. An antenna as recited in claim 9 wherein each said first and second circular wire-grid lens antenna comprises an upper grid and a lower grid, each said collector means comprises an upper portion and a lower portion, said upper portion comprising a plurality of wires having one end connected to the periphery of the upper lens grid at points spaced therealong, an upper terminal whose size is small when compared to the wavelength of operation of said antenna, said wires of said upper portion of said collector means extending away from said upper wire grid mesh to connect to said upper terminal, said lower portion of the collector means comprising a plurality of wires having one end connected at spaced points along the outer periphery of said lower grid mesh, a lower terminal having a size which is small compared to the operating wavelength of said antenna, the wires of said lower portion of said collector means extending to connect to said lower terminal, the wires of said upper and lower portions of said collector means extending outward and toward each other from the respective peripheries of said upper and lower lens meshes in a manner to decrease the dimensions of a coupling means so that the ratio of height-to-width is maintained approximately constant.

No references cited.

HERMAN KARL SAALBACH, *Primary Examiner.*

P. L. GENSLER, *Assistant Examiner.*